(12) United States Patent
Zhang et al.

(10) Patent No.: US 9,866,352 B2
(45) Date of Patent: Jan. 9, 2018

(54) METHOD, DEVICE AND STORAGE MEDIUM FOR IMPROVING DISTANCE MEASURE EQUIPMENT INTERFERENCE RESISTING CAPABILITY OF LTE SYSTEM

(71) Applicant: ZTE Corporation, Shenzhen, Guangdong (CN)

(72) Inventors: Kaimin Zhang, Shenzhen (CN); Bo He, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/032,359

(22) PCT Filed: Jun. 3, 2014

(86) PCT No.: PCT/CN2014/079106
§ 371 (c)(1),
(2) Date: Apr. 27, 2016

(87) PCT Pub. No.: WO2014/180422
PCT Pub. Date: Nov. 13, 2014

(65) Prior Publication Data
US 2016/0269153 A1    Sep. 15, 2016

(30) Foreign Application Priority Data

Oct. 29, 2013    (CN) .......................... 2013 1 0522381

(51) Int. Cl.
*H04L 1/18* (2006.01)
*H04L 1/00* (2006.01)
(Continued)

(52) U.S. Cl.
CPC .......... *H04L 1/1887* (2013.01); *H04L 1/0015* (2013.01); *H04L 5/0055* (2013.01);
(Continued)

(58) Field of Classification Search
CPC ..... H04W 72/04; H04W 76/02; H04W 16/10; H04W 72/1273; H04W 76/048; H04W 52/243; H04L 1/887
See application file for complete search history.

(56) References Cited

U.S. PATENT DOCUMENTS

2009/0086855 A1    4/2009  Jin
2010/0238894 A1    9/2010  Ringstrom
(Continued)

FOREIGN PATENT DOCUMENTS

CN    103188600 A    7/2013
JP    2004266739 A   9/2004
(Continued)

OTHER PUBLICATIONS

International Search Report in international application No. PCT/CN2014/079106, dated Aug. 29, 2014, 2 pgs.
(Continued)

*Primary Examiner* — Muthuswamy Manoharan
(74) *Attorney, Agent, or Firm* — Cooper Legal Group, LLC

(57) ABSTRACT

A method for improving a Distance Measure Equipment (DME) interference resisting capability of a Long Term Evolution (LTE) system are described in the present disclosure; at an LTE User Equipment (UE) side, the method includes that: a symbol level DME interference result is obtained, and a scheduling message is sent according to the obtained symbol level DME interference result or according to the obtained symbol level DME interference result and a Physical Downlink Shared Channel (PDSCH) scheduling situation of a current subframe; at an LTE evolved Node B (eNB) side, the method includes that: the received scheduling message is detected, and a subframe is scheduled according to the received scheduling message. The present disclosure also discloses a UE, an eNB and two computer storage (Continued)

media for improving the DME interference resisting capability of the LTE system.

13 Claims, 4 Drawing Sheets

(51) Int. Cl.
    *H04W 52/24*     (2009.01)
    *H04W 72/12*     (2009.01)
    *H04L 5/00*     (2006.01)
    *H04W 76/04*     (2009.01)
    *H04B 7/185*     (2006.01)

(52) U.S. Cl.
    CPC ..... *H04W 52/243* (2013.01); *H04W 72/1273* (2013.01); *H04W 76/048* (2013.01); *H04B 7/18506* (2013.01)

(56) References Cited

U.S. PATENT DOCUMENTS

| | | | |
|---|---|---|---|
| 2014/0087719 A1* | 3/2014 | Dimou | H04W 16/14 455/422.1 |
| 2014/0094165 A1 | 4/2014 | Karlsson | |
| 2015/0009874 A1* | 1/2015 | Edara | H04W 52/0225 370/311 |
| 2015/0103703 A1* | 4/2015 | Zeng | H04W 72/14 370/280 |
| 2015/0148050 A1* | 5/2015 | Siomina | H04J 11/005 455/452.1 |
| 2016/0242038 A1* | 8/2016 | Lei | H04W 16/10 |

FOREIGN PATENT DOCUMENTS

| | | |
|---|---|---|
| JP | 2007522715 A | 8/2007 |
| JP | 2007523529 A | 8/2007 |
| JP | 2009232109 A | 10/2009 |
| JP | 2012501610 A | 1/2012 |
| RU | 2320085 C2 | 3/2008 |
| WO | 2012158076 A1 | 11/2012 |
| WO | 2012158077 A1 | 11/2012 |

OTHER PUBLICATIONS

English Translation of the Written Opinion of the International Search Authority in international application No. PCT/CN2014/079106, dated Aug. 29, 2014, 6 pgs.

Supplementary European Search Report in European application No. 14794608.1, dated Nov. 8, 2016, 10 pgs.

* cited by examiner

METHOD, DEVICE AND STORAGE MEDIUM FOR IMPROVING DISTANCE MEASURE EQUIPMENT INTERFERENCE RESISTING CAPABILITY OF LTE SYSTEM

TECHNICAL FIELD

The present disclosure relates to a Long Term Evolution (LTE) technology, and more particularly, to a method, device and storage medium for improving a Distance Measure Equipment (DME) interference resisting capability of an LTE system.

BACKGROUND

LTE technology is a technology taking Orthogonal Frequency Division Multiplexing (OFDM)/Frequency Division Multiplexing Access (FDMA) as a core, and it is considered as a quasi-4G technology. Being compared with the 2G/3G technology, the LTE technology has advantages of providing a higher data rate, increasing cell capacity, reducing a system delay, supporting larger cell coverage and the like, so the LTE technology is increasingly favoured by communication operators, and its application range is extended from high-speed train communication to ground-to-air communication, for example, an aircraft communication system which enables passengers to enjoy data services on the flight.

At present, low-altitude communication airline coverage of the LTE is shown in FIG. 1; a ground-to-air wireless channel is established by using an LTE evolved Node B (eNB) 10 for network layout along an airline, and taking an LTE User Equipment (UE) 20 as mechanical communication equipment (airborne LTE UE). The network layout of the LTE in a cabin is shown in FIG. 2; after establishing a connection with the LTE eNB through an external antenna 30, the airborne LTE UE connects a Wireless Fidelity (WiFi) Access Point (AP) 40 through an Ethernet in the cabin to build a wireless local area network, the passengers on the plane can use a smart phone, a Personal Digital Assistant (PDA), a portable computer and other devices to access to the wireless local area network, so as to realize services of surfing the Internet, receiving and sending emails, File Transfer Protocol (FTP) download and the like.

External antenna distribution of an airplane is shown in FIG. 3; except the external antenna, a DME device antenna 50 which is necessary for the airplane is also installed at abdomen of the cabin; transmitting power of the DME is 57 dBm, and a downlink frequency point of the airborne LTE UE is just in a range of frequency point occupied by the DME, so when they work at the same time, a Carrier to Interference plus Noise Ratio (CINR) of a downlink channel of the airborne LTE UE is very low, which seriously influences downstream traffic of the LTE system. Because of being interfered, a subframe interfered by the DME will be retransmitted for many times because it cannot be validated; however, even the same Hybrid Automatic Repeat Request (HARQ) is retransmitted for many times, process data may still not be validated by a Cyclic Redundancy Check (CRC); thus, invalid retransmission of many times will waste wireless resources, and combination failure of many times will influence a Modulation and Coding Scheme (MCS) value of the LTE eNB scheduling the subsequent subframe, which causes a drop of the downstream traffic of the LTE system.

SUMMARY

In view of this, the present disclosure provides a method, device and storage medium for improving a DME interference resisting capability of an LTE system, which can effectively improve downstream traffic of the LTE system when being interfered by DME.

To this end, the technical solutions of the present disclosure are implemented as follows.

According to a first aspect of the present disclosure, a method for improving a DME interference resisting capability of an LTE system is provided, which includes that:
  a symbol level DME interference result is obtained; and
  a scheduling message is sent according to the obtained symbol level DME interference result or according to the obtained symbol level DME interference result and a Physical Downlink Shared Channel (PDSCH) scheduling situation of a current subframe.

Preferably, the step of obtaining the symbol level DME interference result may include that:
  the symbol level DME interference result is obtained by comparing a power ratio between time domain data symbols with a preset threshold.

Preferably, the step of obtaining the symbol level DME interference result by comparing the power ratio between the time domain data symbols with the preset threshold may include that:
  when the power ratio between the time domain data symbols is greater than or equal to the preset threshold, it is determined that there is a symbol level DME interference.

Preferably, the step of sending the scheduling message according to the obtained symbol level DME interference result and the PDSCH scheduling situation of the current subframe may include that:
  when there is a symbol level DME interference and there is PDSCH scheduling at the current subframe, a Discontinuous Transmission (DTX) message is sent.

Preferably, the step of obtaining the symbol level DME interference result by comparing the power ratio between time domain data symbols with the preset threshold may include that:
  when the power ratio between the time domain data symbols is less than the preset threshold, it is determined that there is no symbol level DME interference.

Preferably, the step of sending the scheduling message according to the obtained symbol level DME interference result and the PDSCH scheduling situation of the current subframe may include that:
  when there is a symbol level DME interference and there is no PDSCH scheduling at the current subframe, an Acknowledgement (ACK) message is sent;
  the step of sending the scheduling message according to the obtained symbol level DME interference result may include that:
  when there is no symbol level DME interference, a Non-Acknowledgement (NACK) message is sent.

According to a second aspect of the present disclosure, a method for improving a DME interference resisting capability of an LTE system is provided, which includes that:
  a scheduling message is received, and a subframe is scheduled according to the received scheduling message.

Preferably, the step of scheduling the subframe according to the received scheduling message may include that:
  when a DTX message is received, an interfered subframe serving as newly transmitted data of an HARQ is scheduled again;
  when an ACK message is received, an MCS value of a subsequent subframe is increased, and the subsequent subframe is scheduled; and when a NACK message is received, the MCS value is decreased, and retransmitted data of an HARQ process is scheduled, and an HARQ combination is performed.

According to a third aspect of the present disclosure, a UE for improving a DME interference resisting capability of an LTE system is provided, which includes: a first downlink Physical (PHY) layer, a first Media Access Control (MAC) layer, and a first uplink PHY layer; wherein, the first downlink PHY layer is configured to obtain a symbol level DME interference result;

the first MAC layer is configured to inform the first uplink PHY layer to send the scheduling message according to the symbol level DME interference result sent by the first downlink PHY layer or according to the symbol level DME interference result and whether there is the PDSCH scheduling at a current subframe; and the first uplink PHY layer is configured to send the scheduling message according to the information of the first MAC layer.

Preferably, the first downlink PHY layer may be configured to obtain the symbol level DME interference result by comparing the power ratio between time domain data symbols with the preset threshold.

Preferably, the first downlink PHY layer may be configured to, when the power ratio between the time domain data symbols is greater than or equal to the preset threshold, determine that there is a symbol level DME interference.

Preferably, the first MAC layer may include:

a first processing module, which is configured to, when there is a symbol level DME interference and there is PDSCH scheduling at the current subframe, inform the first uplink PHY layer to send the DTX message.

Preferably, the first downlink PHY layer may be further configured to, when the power ratio between the time domain data symbols is less than the preset threshold, determine that there is no symbol level DME interference.

Preferably, the first MAC layer may include:

a second processing module, which is further configured to, when there is a symbol level DME interference and there is no PDSCH scheduling at the current subframe, inform the first uplink PHY layer to send the ACK message; and a third processing module, which is further configured to, when there is no symbol level DME interference, inform the first uplink PHY layer to send a NACK message.

According to a fourth aspect of the present disclosure, an eNB for improving a DME interference resisting capability of an LTE system is provided, which includes: a second uplink PHY layer, a second MAC layer and a second downlink PHY layer; wherein, the second uplink PHY layer is configured to detect in real time whether the scheduling message is received, and send the detected scheduling message to the second MAC layer;

the second MAC layer is configured to schedule the subframe according to the scheduling message sent by the second uplink PHY layer; and the second downlink PHY layer is configured to send downlink time domain data to a first downlink PHY layer according to scheduling information of the second MAC layer.

Preferably, the second MAC layer is configured to, when a DTX message is received, schedule again the interfered subframe serving as the newly transmitted data of the HARQ, when an ACK message is received, increase a MCS value of a subsequent subframe and schedule the subsequent subframe, and when a NACK message is received, decrease the MCS value of the subsequent subframe, schedule the retransmitted data of the HARQ process, and perform the HARQ combination.

According a fifth aspect of the present disclosure, a computer storage medium is provided, in which a computer executable instruction is stored; the computer executable instruction is used for performing the method in any technical solution according to the first aspect of the present disclosure.

According a sixth aspect of the present disclosure, a computer storage medium is provided, in which a computer executable instruction is stored; the computer executable instruction is used for performing the method in any technical solution according to the second aspect of the present disclosure.

With the method, device and storage medium for improving the DME interference resisting capability of the LTE system which are provided by the present disclosure, at the LTE UE side, the symbol level DME interference result is obtained, and the corresponding scheduling message is sent according to the obtained symbol level DME interference result or according to the obtained symbol level DME interference result and the PDSCH scheduling situation of the current subframe; at the LTE eNB side, the subframe is scheduled according to the received scheduling message; thus, the DME can only influence the interference subframe, but not decrease the MCS value of the adjacent subframe; besides, a waste of wireless resources will not be caused by retransmitting interference subframe data for many times, and the downstream traffic of the LTE system when being interfered by the DME can be effectively improved.

DETAILED DESCRIPTION

Figure 1:
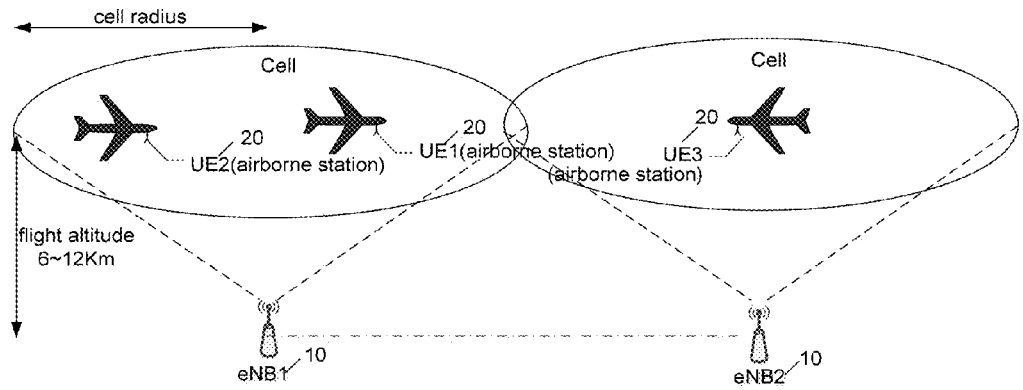
FIG. 1 is a schematic diagram of low-altitude communication airline coverage of LTE.
Figure 2:
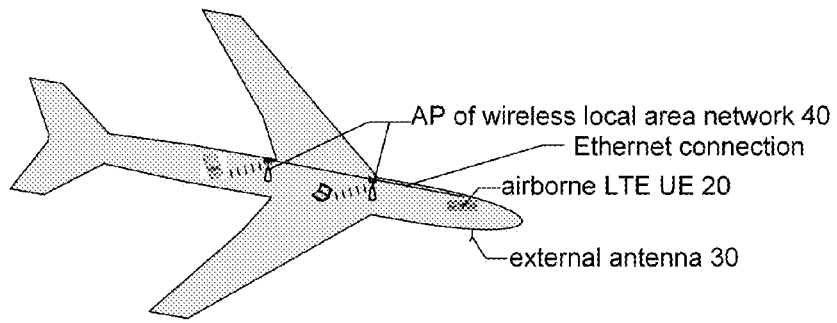
FIG. 2 is a schematic diagram of network layout of LTE in a cabin.
Figure 3:
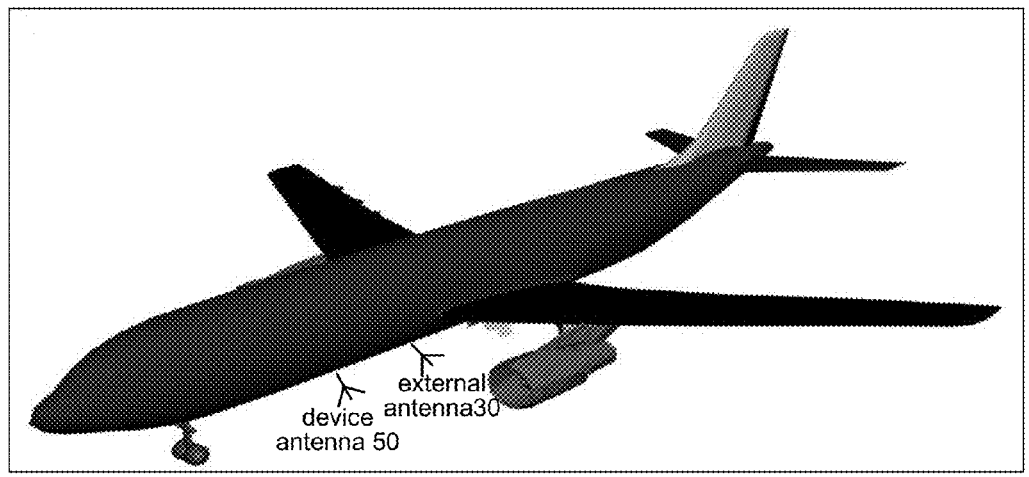
FIG. 3 is a schematic diagram of external antenna distribution of an airplane.

The preferred embodiments of the present disclosure are elaborated below in combination with the accompanying drawings; it should be understood that the preferred embodiments elaborated below are only used for elaborating and illustrating the present disclosure and not intended to limit the present disclosure.

Methods for improving a DME interference resisting capability of an LTE system in the present disclosure include a method at a terminal side and a method at a base station side.

The method at the terminal side includes that: a symbol level DME interference result is obtained; and a scheduling message is sent according to the obtained symbol level DME interference result or according to a DME and a PDSCH scheduling situation of a current subframe.

The method at the base station includes that: a scheduling message is received, wherein the scheduling message is sent by the terminal according to the obtained symbol level DME interference result or according to the DME and the PDSCH scheduling situation of the current subframe; and a subframe is scheduled according to the scheduling message.

The symbol level interference result includes that there is a symbol level DME interference and there is no symbol level DME interference;

when there is no symbol level DME interference, the UE sends an NACK message only according to the symbol level DME interference result;
   when there is the symbol level DME interference, the UE can further determine a type of the sent scheduling message according to the PDSCH scheduling situation of the current subframe;
   specifically, when there is the symbol level DME interference and there is PDSCH scheduling at the current subframe, a DTX message is sent; when there is the symbol level DME interference and there is no PDSCH scheduling at the current subframe, an ACK message is sent.

In the present disclosure, the LTE UE and the LTE eNB respectively include an uplink PHY layer, a downlink PHY layer and an MAC layer; for describing conveniently, the uplink PHY layer, the downlink PHY layer and the MAC layer of the LTE UE are called the first uplink PHY layer, the first downlink PHY layer and the first MAC layer; the uplink PHY layer, the downlink PHY layer and the MAC layer of the LTE eNB are called the second uplink PHY layer, the second downlink PHY layer and the second MAC layer.

Specifically, a terminal for implementing the method at the terminal side may include the following structure:

a first downlink PHY layer, configured to obtain a symbol level DME interference result;
   a first MAC layer, configured to judge a situation that a current subframe is interfered by a DME according to the symbol level DME interference result sent by the first downlink PHY layer or according to the symbol level DME interference result and whether there is the PDSCH scheduling at the current subframe, and inform a first PHY layer to send a scheduling message; and
   a first uplink PHY layer, configured to send the scheduling message according to the information of the first MAC layer.

Here, the first MAC layer can be divided into a first processing module, a second processing module and a third processing module; wherein the first processing module is configured to, when there is the symbol level DME interference and there is the PDSCH scheduling at the current subframe, inform the first uplink PHY layer to send the DTX message;
   the second processing module is configured to, when there is the symbol level DME interference and there is no PDSCH scheduling at the current subframe, inform the first uplink PHY layer to send the ACK message; and
   the third processing module is configured to, when there is no symbol level DME interference, determine that the current subframe is not interfered by the DME, and inform the first uplink PHY layer to send the NACK message.

Specifically, the base station for implementing the method at the base station side may include the following structure:

a second uplink PHY layer, configured to detect in real time whether a scheduling message is received, and send the detected scheduling message to a second MAC layer;
   the second MAC layer, configured to schedule a subframe according to the scheduling message sent by the second uplink PHY layer; and
   a second downlink PHY layer, configured to send downlink time domain data to the first downlink PHY layer according to scheduling information of the second MAC layer.

In the present disclosure, the first downlink PHY layer obtains a symbol level DME interference result by comparing a power ratio between time domain data symbols with a preset threshold;

wherein, data will be saturated when a DME signal comes, then the preset threshold can be calculated according to the power ratio between the saturated data and normal data of a wireless receiving device; generally, the range of the preset threshold may be 2 dB-10 dB.

Determining whether the current subframe is interfered by the DME according to the obtained symbol level DME interference result and the PDSCH scheduling situation of the current subframe, and sending the corresponding scheduling message specifically includes that:

if there is the symbol level DME interference and there is the PDSCH scheduling at the current subframe, the first MAC layer determines that the current subframe is interfered by the DME, and informs the first uplink PHY layer to send the DTX message;
   if there is the symbol level DME interference and there is no PDSCH scheduling at the current subframe, the first MAC layer determines that the current subframe is not interfered by the DME, and informs the first uplink PHY layer to send the ACK message; and
   if there is no DME interference, the first MAC layer determines that the current subframe is not interfered by the DME, and informs the first uplink PHY layer to send the NACK message.

The LTE eNB side scheduling according to the received scheduling message specifically includes that:

after the second MAC layer receives the DTX message, the interfered subframe is scheduled again as newly transmitted data of HARQ, and an HARQ combination is not performed on the interfered subframe;
   after the second MAC layer receives the ACK message, the second MAC layer increases an MCS value of the subsequent subframe while scheduling a subsequent subframe;

after the second MAC layer receives the NACK message, the second MAC layer decreases an MCS value of the subsequent subframe while scheduling retransmitted data of a corresponding HARQ process, and performs the HARQ combination.

Figure 4:
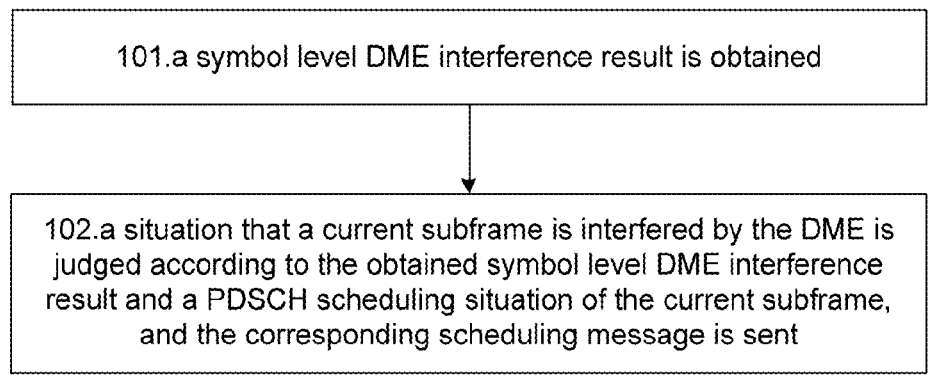
FIG. 4 is a basic implementation flowchart of a method for improving a DME interference resisting capability of an LTE system at an LTE UE side provided by the present disclosure.

In the method for improving the DME interference resisting capability of the LTE system of the present disclosure, as shown in FIG. 4, the basic implementation flow at the LTE UE side includes the following steps:

Step 101: a symbol level DME interference result is obtained;

here, the first downlink PHY layer obtains the symbol level DME interference result by comparing the power ratio between time domain data symbols with the preset threshold, and sends the obtained result to the first MAC layer;

wherein, for the preset threshold, because the data will be saturated when the DME signal comes, the preset threshold can be calculated according to the power ratio between the saturated data and the normal data of the wireless receiving device; the range of the preset threshold can be 2 dB-10 dB;

Step 102: a situation that a current subframe is interfered by the DME is judged according to the obtained symbol level DME interference result and a PDSCH scheduling situation of the current subframe, and the corresponding scheduling message is sent;

herein, the first MAC layer determining whether the current subframe is interfered by the DME according to the symbol level DME interference result reported by the first downlink PHY layer and whether there is the PDSCH scheduling at the current subframe specifically includes that:

if there is the symbol level DME interference and there is the PDSCH scheduling at the current subframe, it is determined that the current subframe is interfered by the DME;

if there is the symbol level DME interference and there is no PDSCH scheduling at the current subframe, it is determined that the current subframe is not interfered by the DME; and if there is no symbol level DME interference, it is determined that the current subframe is not interfered by the DME;

correspondingly, the first MAC layer sending the corresponding scheduling message according to the symbol level DME interference result of the current subframe specifically includes that:

if the current subframe is interfered by the DME, the first MAC layer informs the first uplink PHY layer to send the DTX message;

if the current subframe is not interfered by the DME, the first MAC layer informs the first uplink PHY layer to send the ACK/NACK message;

correspondingly, the first PHY layer sends the DTX message or the ACK/NACK message according to the information of the first MAC layer.

Here, how to send the DTX message or the ACK/NACK message belongs to the related art, which will not be repeated here.

Figure 5:
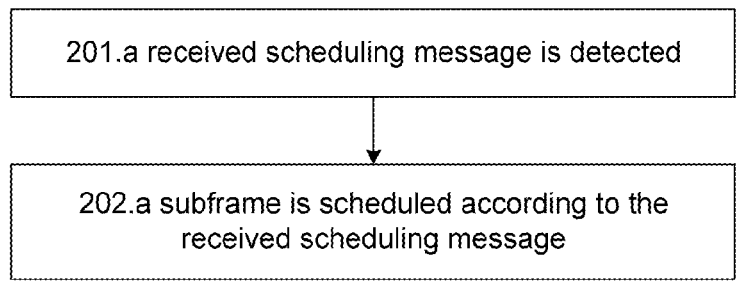
FIG. 5 is a basic implementation flowchart of a method for improving a DME interference resisting capability of an LTE system at an LTE eNB side provided by the present disclosure.

In the method for improving the DME interference resisting capability of the LTE system of the present disclosure, as shown in FIG. 5, the basic implementation flow at the LTE eNB side includes the following steps:

Step 201: a received scheduling message is detected;

herein, the second uplink PHY layer detects in real time whether the scheduling message is received, that is, whether the DTX message or the ACK/NACK message is received, and sends the detected DTX message or ACK/NACK message to the second MAC layer.

Step 202: a subframe is scheduled according to the received scheduling message;

specifically, after the second MAC layer receives the DTX message, the interfered subframe is scheduled again as the newly transmitted data of the HARQ; scheduling again avoids a long-spaced narrow pulse interference of the DME, and not performing the HARQ combination on the interfered subframe does not influence the MCS value of the PDSCH of the subsequent subframe;

after the second MAC layer receives the ACK message, the second MAC layer increases the MCS value of the subsequent subframe while scheduling the subsequent subframe;

after the second MAC layer receives the NACK message, the second MAC layer decreases the MCS value of the subsequent subframe while scheduling the retransmitted data of the corresponding HARQ process, and performs the HARQ combination.

After step 202, the method may further include that: the second downlink PHY layer of the LTE eNB performs the subsequent processing according to an LTE protocol; how to perform belongs to the related art, which will not be repeated here.

The technical solutions of the present disclosure are further elaborated below in combination with the accompanying drawings and specific embodiments.

Figure 6:
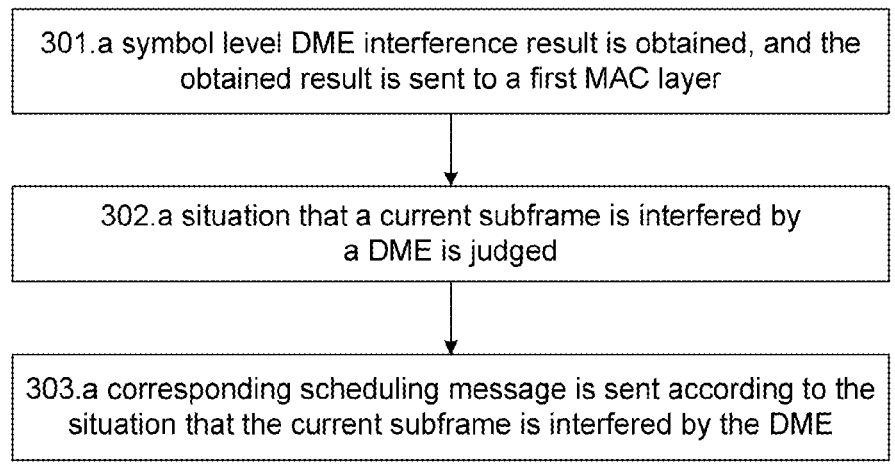
FIG. 6 is a specific implementation flowchart of a method for improving a DME interference resisting capability of an LTE system at an LTE UE side provided by the present disclosure.

As shown in FIG. 6, the specific implementation flow of a method for improving a DME interference resisting capability of an LTE system at an LTE UE side includes the following steps.

Step 301: a symbol level DME interference result is obtained, and the obtained result is sent to a first MAC layer;

specifically, a first downlink PHY layer obtains the symbol level DME interference result by calculating and comparing the power ratio between the adjacent symbols of the time domain data symbols 0-13 with the preset threshold, and sends the result to the first MAC layer;

for the preset threshold, because the data will be saturated when the DME signal comes, the preset threshold can be calculated according to the power ratio between the saturated data and the normal data of the wireless receiving device; the range of the preset threshold can be 2 dB-10 dB; in the present embodiment, the preset threshold is 6 dB;

wherein, the symbol level DME interference result is expressed by a bit stream bit0-bit13 of 14 bits; the specific definition is that: bit0 being equal to 1 indicates that the power ratio between the symbol 0 and the previous frame symbol 13 is greater than or equal to the threshold, and it is determined that there is the symbol level DME interference; bit0 being equal to 0 indicates the power ratio between the symbol 0 and the previous frame symbol 13 is less than the threshold, and it is determined that there is no symbol level DME interference; bit1 being equal to 1 indicates that the power ratio between the symbol 1 and the symbol 0 is greater than or equal to the threshold, and it is determined that there is the symbol level DME interference; bit1 being equal to 0 indicates that the power ratio between the symbol 1 and the symbol 0 is less than the threshold, it is determined that there is no symbol level DME interference; by that analogy, it is determined whether there is the symbol level DME interference in the following.

Step 302: a situation that a current subframe is interfered by a DME is judged;

the first MAC layer determining whether the current subframe is interfered by the DME according to the symbol level DME interference result reported by the first downlink PHY layer and whether there is PDSCH scheduling at the current subframe specifically includes that:

if there is the symbol level DME interference and there is the PDSCH scheduling at the current subframe, it is determined that the current subframe is interfered by the DME;

if there is the symbol level DME interference and there is no PDSCH scheduling at the current subframe, it is determined that the current subframe is not interfered by the DME; and if there is no symbol level DME interference, it is determined that the current subframe is not interfered by the DME.

Step 303: a corresponding scheduling message is sent according to the situation that the current subframe is interfered by the DME;

specifically, if the current subframe is interfered, the first MAC layer informs a first uplink PHY layer to send the DTX message;

if the current subframe is not interfered, the first MAC layer informs the first uplink PHY layer to send the ACK/NACK message;

correspondingly, the first PHY layer sends the DTX message or the ACK/NACK message according to the information of the first MAC layer.

Here, how to send the DTX message or the ACK/NACK message belongs to the related art, which will not be repeated here.

Figure 7:
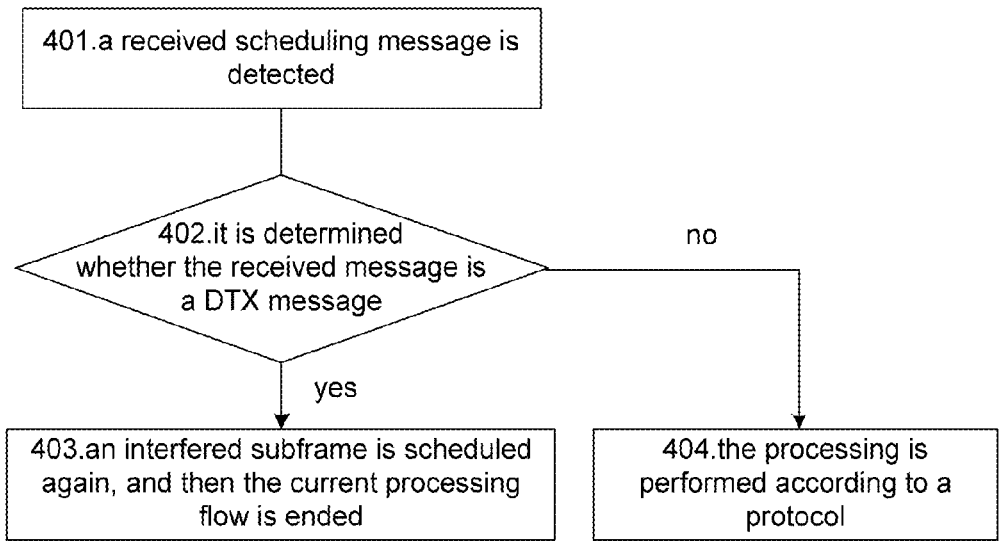
FIG. 7 is a specific implementation flowchart of a method for improving a DME interference resisting capability of an LTE system at an LTE eNB side provided by the present disclosure.

After steps 301-303 are performed, the LTE eNB performs the subsequent processing according to the scheduling message sent by the first uplink PHY layer to form a processing method in which the LTE UE and the LTE eNB interact; as shown in FIG. 7, the specific implementation flow of a method for improving a DME interference resisting capability of an LTE system at an LTE eNB side of the present disclosure includes the following steps.

Step 401: a received scheduling message is detected;

herein, a second uplink PHY layer detects in real time whether a scheduling message is received, that is, whether a DTX message or an ACK/NACK message is received, and sends the detected DTX message or ACK/NACK message to a second MAC layer.

Step 402: it is determined whether the received message is a DTX message; if so, perform step 403; otherwise, perform step 404;

here, the second MAC layer determines whether the received message is the DTX message.

Step 403: an interfered subframe is scheduled again, and then the current processing flow is ended;

specifically, the second MAC layer schedules again the interfered subframe serving as the newly transmitted data of the HARQ; scheduling again avoids the long-spaced narrow pulse interference of the DME, and not performing the HARQ combination on the interfered subframe does not influence the MCS value of the PDSCH of the subsequent subframe.

Step 404: the processing is performed according to an LTE protocol;

herein, after the second MAC layer receives an ACK message, the second MAC layer increases an MCS value of the subsequent subframe while scheduling the subsequent subframe;

after the second MAC layer receives a NACK message, the second MAC layer decreases the MCS value of the subsequent subframe while scheduling the retransmitted data of the corresponding HARQ process, and performs the HARQ combination.

After step 404, the method may further include that: the second downlink PHY layer performs the subsequent processing according to the LTE protocol; how to perform belongs to the related art, which will not be repeated here.

With the method for improving the DME interference resisting capability of the LTE system provided by the present disclosure, when a threshold is set as 6 dB, downstream traffic of the LTE system when being interfered by the DME can be improved from 13% of the traffic without interference to 80% of the traffic without interference, which not only saves the traffic, but also avoids the waste of wireless resources.

Figure 8:
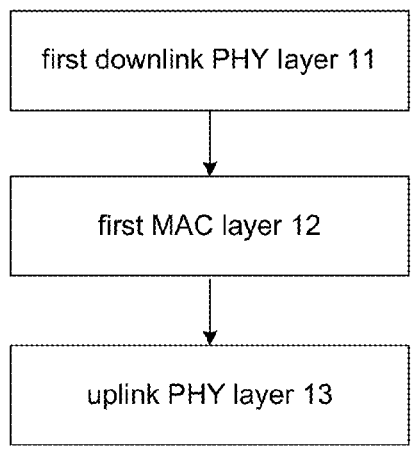
FIG. 8 is a structure diagram of a UE for improving a DME interference resisting capability of an LTE system provided by the present disclosure.

For implementing the method for improving the DME interference resisting capability of the LTE system, the present disclosure also provides a UE for improving a DME interference resisting capability of an LTE system; as shown FIG. 8, the structure of the UE for improving the DME interference resisting capability of the LTE system includes: a first downlink PHY layer 11, a first MAC layer 12 and a first uplink PHY layer 13; wherein, the first downlink PHY layer 11 is configured to obtain a symbol level DME interference result;

herein, the first downlink PHY layer obtains the symbol level DME interference result by comparing a power ratio between time domain data symbols with the preset threshold, and sends the obtained result to the first MAC layer;

the first MAC layer 12 is configured to judge a situation that the current subframe is interfered by a DME according to the symbol level DME interference result sent by the first downlink PHY layer and whether there is PDSCH scheduling at a current subframe, and inform the first PHY layer to send a corresponding scheduling message;

the first MAC layer 12 judging the situation that the current subframe is interfered by the DME according to the symbol level DME interference result sent by the first downlink PHY layer and whether there is the PDSCH scheduling at the current subframe is specifically that:

if there is the symbol level DME interference and there is the PDSCH scheduling at the current subframe, then it is determined that the current subframe is interfered by the DME;

if there is the symbol level DME interference and there is no PDSCH scheduling at the current subframe, then it is determined that the current subframe is not interfered by the DME;

if there is no symbol level DME interference, then it is determined that the current subframe is not interfered by the DME;

The first MAC layer 12 scheduling correspondingly according to the symbol level DME interference result of the current subframe is specifically that:

when the current subframe is interfered by the DME, the first MAC layer 12 informs the first uplink PHY layer 13 to send the DTX message;

when the current subframe is not interfered by the DME, the first MAC layer 12 informs the first uplink PHY layer 13 to send the ACK/NACK message;

the first uplink PHY layer 13 is configured to send the DTX message or the ACK/NACK message according to the information of the first MAC layer 12.

Figure 9:
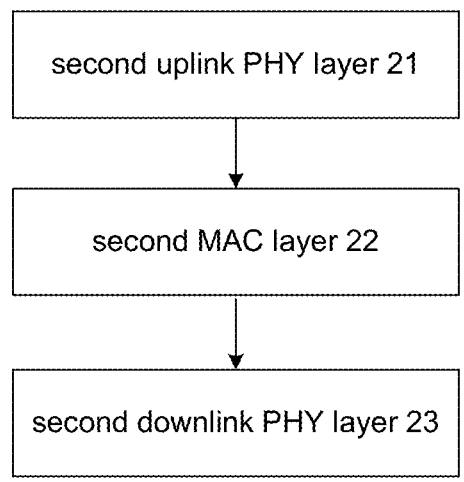
FIG. 9 is a structure diagram of an eNB for improving a DME interference resisting capability of an LTE system provided by the present disclosure.

For implementing the method for improving the DME interference resisting capability of the LTE system, the present disclosure also provides an eNB improving a DME interference resisting capability of an LTE system; as shown FIG. 9, the structure of the eNB for improving the DME interference resisting capability of the LTE system includes: a second uplink PHY layer 21, a second MAC layer 22 and a second uplink PHY layer 23; wherein, the second uplink PHY layer 21 is configured to detect in real time whether a scheduling message is received, and send the detected scheduling message to the second MAC layer;

specifically, the uplink PHY layer 21 sends a DTX message or an(a) ACK/NACK message sent by the first uplink PHY layer 13 to the second MAC layer 22;

the second MAC layer 22 is configured to schedule according to the scheduling message sent by the second uplink PHY layer 21;

specifically, the second MAC layer 22 is configured to, when the received message is the DTX message, schedule again the interfered subframe serving as the newly transmitted data of the HARQ;

the second MAC layer 22 is configured to, when the ACK message is received, increase an MCS value of a subsequent subframe and schedule the subsequent subframe;

the second MAC layer 22 is configured to, when the NACK message is received, decrease the MCS value of the subsequent subframe, schedule the retransmitted data of the HARQ process, and perform the HARQ combination;

the second downlink PHY layer 23 is configured to send downlink time domain data to the first downlink PHY layer 11 according to the scheduling information of the second MAC layer 22.

Note that, in practical applications, functions of the first MAC layer 12 and the second MAC layer 22 can be implemented by a Central Processing Unit (CPU), and/or a Micro Processing Unit (MPU); functions of the first downlink PHY layer 11, the first uplink PHY layer 13, the second uplink PHY layer 21 and the second downlink PHY layer can be implemented by a Digital Signal Processor (DSP), and/or a Field-Programmable Gate Array (FPGA). The CPU, and/or the MPU, and/or the DSP, and/or the FPGA can be respectively at the LTE UE side, and/or the LTE eNB side.

The present disclosure also records a computer storage medium in which a computer executable instruction is stored; the computer executable instruction is used for performing the method described in any technical solution at the base station side.

The present disclosure also records another computer storage medium in which a computer executable instruction is stored; the computer executable instruction is used for performing the method described in any technical solution at the base station side.

The storage medium can be a USB flash disk, a compact disc, a digital video disk or a mobile hard disk, and so on; a non-instant storage medium is preferable.

Figure 10:
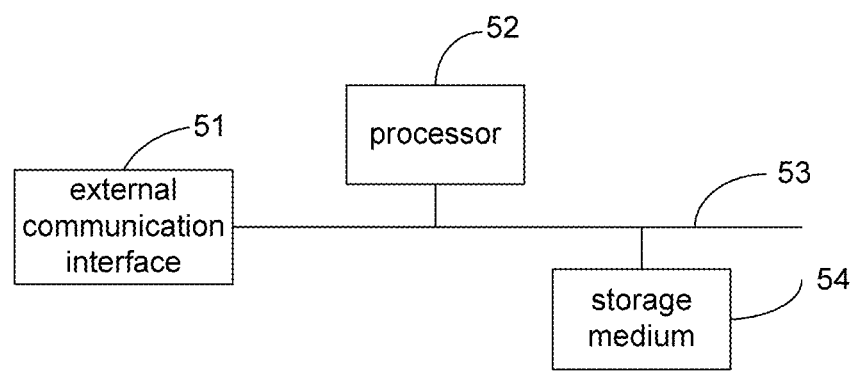
FIG. 10 is a structure diagram of a device for implementing a method for improving a DME interference resisting capability of an LTE system provided by the present disclosure.

The present disclosure also provides a device shown in FIG. 10; the device includes a processor 52, a storage medium 54 and at least one external communication interface 51; the processor 52, the storage medium 54 and the external communication interface 51 are connected via a bus 53. The processor 52 can be the microprocessor, the CPU, the DSP or the FPGA, and other electronic components with a processing function.

The storage medium 54 stores the computer executable instruction; the processor 52 performs any one of the following two solutions which can be implemented by the computer executable instruction stored in the storage medium 54.

Solution 1:
a symbol level DME interference result is obtained; and
a scheduling message is sent according to the obtained symbol level DME interference result or according to the obtained symbol level DME interference result and a PDSCH scheduling situation of a current subframe.

Solution 2:
a scheduling message is received; wherein, the scheduling message is sent by a terminal according to a obtained symbol level DME interference result or according to the obtained symbol level DME interference result and a PDSCH scheduling situation of a current subframe; and the subframe is scheduled according to the received scheduling message.

When being used for performing the solution 1, the device can serve as a part of the mobile terminal UE; when being used for performing the solution 2, the device can serve as a part of the base station, for example, as a part of the eNB.

The external communication interface 51 is a wireless communication interface preferably, for example, a transceiver antenna or a transceiver antenna array.

The above is only the preferred embodiments of the present disclosure and not intended to limit the scope of the claims of the present disclosure. It should be understood that any modification made according to the principle of the present disclosure falls within the scope of the claims of the present disclosure.

What is claimed is:

1. A method for improving a Distance Measure Equipment (DME) interference resisting capability of a Long Term Evolution (LTE) system, comprising: comparing a power ratio between time domain data symbols with a preset threshold to obtain a symbol level DME interference result, comprising: comparing the power ratio between adjacent time domain data symbols of time domain data symbols 0, 1, 2 . . . 12, 13 with the preset threshold, when the power ratio between the adjacent time domain data symbols is greater than and equal to the preset threshold, determining that there is a symbol level DME interference, and when the power ratio between the adjacent time domain data symbols is less than the preset threshold, determining that there is no symbol level DME interference; and sending a scheduling message according to the obtained symbol level DME interference result or according to the obtained symbol level DME interference result and a Physical Downlink Shared Channel (PDSCH) scheduling situation of a current subframe.

2. The method for improving the DME interference resisting capability of the LTE system according to claim 1, wherein, the step of sending the scheduling message according to the obtained symbol level DME interference result and the PDSCH scheduling situation of the current subframe comprises:

when there is a symbol level DME interference and there is PDSCH scheduling at the current subframe, sending a Discontinuous Transmission (DTX) message.

3. The method for improving the DME interference resisting capability of the LTE system according to claim 1, wherein,
the step of sending the scheduling message according to the obtained symbol level DME interference result and the PDSCH scheduling situation of the current subframe comprises:
when there is a symbol level DME interference and there is no PDSCH scheduling at the current subframe, sending an Acknowledgement (ACK) message;
the step of sending the scheduling message according to the obtained symbol level DME interference result comprises:
when there is no symbol level DME interference, sending a Non-Acknowledgement (NACK) message.

4. The method for improving the DME interference resisting capability of the LTE system according to claim 1, wherein the preset threshold is comprised between 2 dB to 10 dB.

5. The method for improving the DME interference resisting capability of the LTE system according to claim 1, wherein the symbol level DME interference result is indicated by a bit stream bit0-bit13 of 14 bits, wherein a bitN indicates that the power ratio between the symbol N and the previous symbol N−1 is greater than and equal to the preset threshold when the bitN is equal to 1, and that the power ratio between the symbol N and the previous symbol N−1 is less than the preset threshold when the bitN is equal to 0, where N=0, 1, . . . , 12, 13.

6. A User Equipment (UE) for improving a Distance Measure Equipment (DME) interference resisting capability of a Long Term Evolution (LTE) system, comprising: a first downlink Physical (PHY) layer, a first Media Access Control (MAC) layer, and a first uplink PHY layer; wherein, the first downlink PHY layer is configured to compare a power ratio between time domain data symbols with a preset threshold to obtain a symbol level DME interference result, and further configured to: compare the power ratio between adjacent time domain data symbols of time domain data symbols 0, 1, 2 . . . 12, 13 with the p reset threshold, when the power ratio between the adjacent time domain data symbols is greater than and equal to the preset threshold, determine that there is a symbol level DME interference, and when the power ratio between the adjacent time domain data symbols is less than the preset threshold, determine that there is no symbol level DME interference; the first MAC layer is configured to inform the first uplink PHY layer to send a scheduling message according to the symbol level DME interference result sent by the first downlink PHY layer or according to the symbol level DME interference result and whether there is Physical Downlink Shared Channel (PDSCH) scheduling at a current subframe; and the first uplink PHY layer is configured to send the scheduling message according to the information of the first MAC layer.

7. The UE for improving the DME interference resisting capability of the LTE system according to claim 6, wherein, the first MAC layer comprises:
a first processing module, which is configured to, when there is a symbol level DME interference and there is PDSCH scheduling at the current subframe, inform the first uplink PHY layer to send a Discontinuous Transmission (DTX) message.

8. The UE for improving the DME interference resisting capability of the LTE system according to claim 6, wherein the first MAC layer comprises:
a second processing module, which is configured to, when there is a symbol level DME interference and there is no PDSCH scheduling at the current subframe, inform the first uplink PHY layer to send an Acknowledgement (ACK) message; and
a third processing module, which is configured to, when there is no symbol level DME interference, determine that the current subframe is not interfered by a DME, and inform the first uplink PHY layer to send a Non-Acknowledgement (NACK) message.

9. The UE for improving the DME interference resisting capability of the LTE system according to claim 6, wherein the preset threshold is comprised between 2 dB to 10 dB.

10. The UE for improving the DME interference resisting capability of the LTE system according to claim 6, wherein the symbol level DME interference result is indicated by a bit stream bit0-bit13 of 14 bits, wherein a bitN indicates that the power ratio between the symbol N and the previous symbol N−1 is greater than and equal to the preset threshold when the bitN is equal to 1, and that the power ratio between the symbol N and the previous symbol N−1 is less than the preset threshold when the bitN is equal to 0, where N=0, 1, . . . , 12, 13.

11. A non-transitory computer storage medium in which a computer executable instruction is stored, the computer executable instruction is used for performing a method for improving a Distance Measure Equipment (DME) interference resisting capability of a Long Term Evolution (LTE) system, comprising: comparing a power ratio between time domain data symbols with a preset threshold to obtain a symbol level DME interference result, comprising: comparing the power ratio between adjacent time domain data symbols of time domain data symbols 0, 1, 2 . . . 12, 13 with the preset threshold; when the power ratio between the adjacent time domain data symbols is greater than and equal to the preset threshold, determining that there is a symbol level DME interference, and when the power ratio between the adjacent time domain data symbols is less than the preset threshold, determining that there is no symbol level DME interference; and sending a scheduling message according to the obtained symbol level DME interference result or according to the obtained symbol level DME interference result and a Physical Downlink Shared Channel (PDSCH) scheduling situation of a current subframe.

12. The non-transitory computer storage medium according to claim 11, wherein the preset threshold is comprised between 2 dB to 10 dB.

13. The non-transitory computer storage medium according to claim 11, wherein the symbol level DME interference result is indicated by a bit stream bit0-bit13 of 14 bits, wherein a bitN indicates that the power ratio between the symbol N and the previous symbol N−1 is greater than and equal to the preset threshold when the bitN is equal to 1, and that the power ratio between the symbol N and the previous symbol N−1 is less than the preset threshold when the bitN is equal to 0, where N=0, 1, . . . , 12, 13.

* * * * *